UNITED STATES PATENT OFFICE.

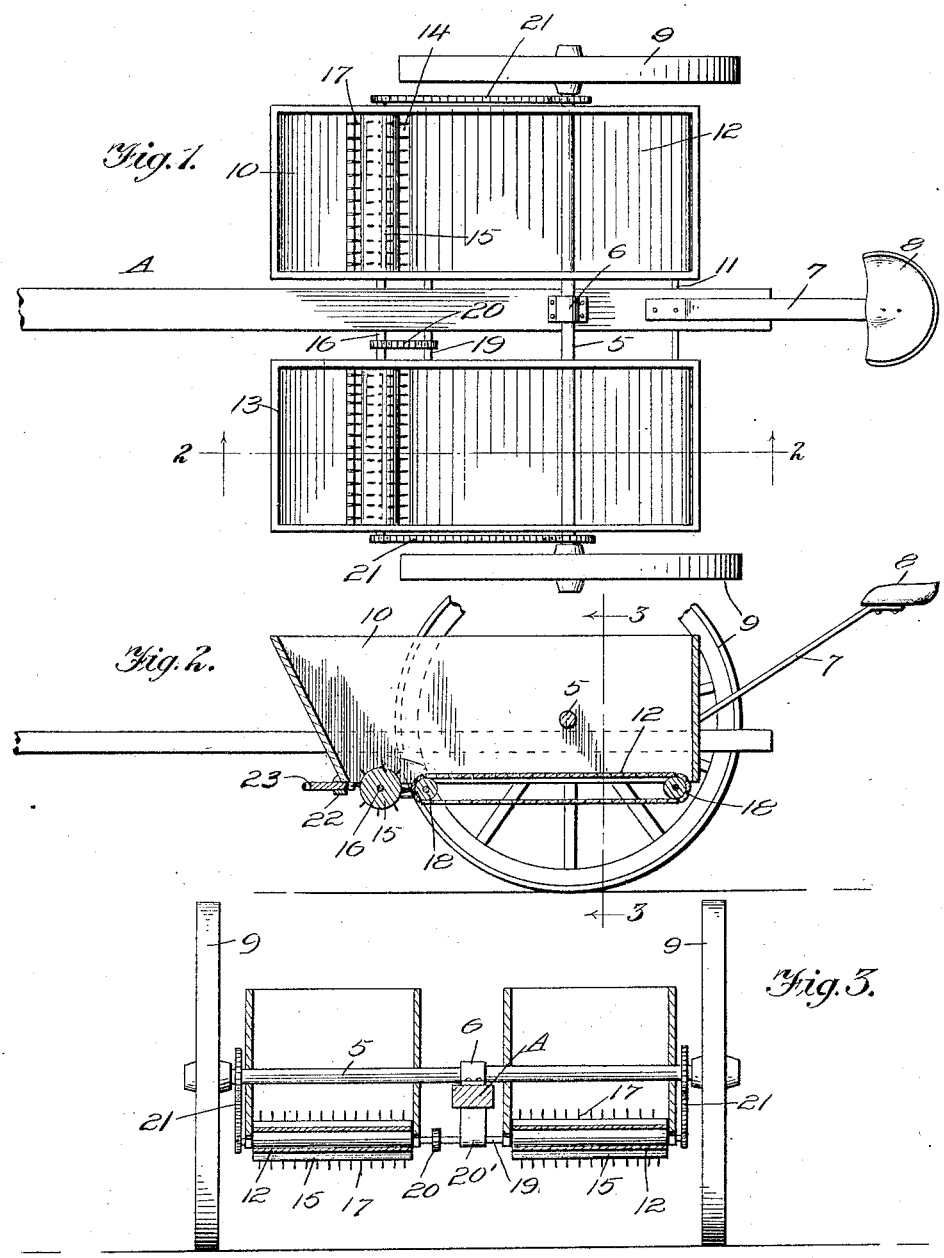

WILLIAM C. LEMINGER, OF SULLIVAN, INDIANA.

MANURE-SPREADER.

1,389,518.  Specification of Letters Patent.  Patented Aug. 30, 1921.

Application filed March 26, 1920. Serial No. 369,024.

*To all whom it may concern:*

Be it known that I, WILLIAM C. LEMINGER, a citizen of the United States, residing at Sullivan, in the county of Sullivan and State of Indiana, have invented certain new and useful Improvements in Manure-Spreaders, of which the following is a specification.

The invention relates to a machine for spreading manure, and has for its primary object to provide a machine of this character wherein the body is divided to form independent containers spaced apart so as to be disposed on opposite sides of the center line of draft of the machine, thereby enabling the manure to be spread on the rows of growing crop in a field, the distributing mechanism for the manure in the containers being of novel arrangement and actuated by the wheels of said machine when the same is drawn over a field.

Another object of the invention is the provision of a machine of this character, wherein the manure in the containers is distributed from the front thereof onto the ground at opposite sides of the center line of draft of the machine to be delivered to several rows in the advancement of the machine through a field.

A further object of the invention is the provision of a machine of this character which is extremely simple in construction, thoroughly reliable and efficient in purpose, and inexpensive to manufacture.

With these and other objects in view, the invention consists in the features of construction, combination and arrangement of parts as will be hereinafter fully described, illustrated in the accompanying drawings and pointed out in the claims hereunto appended.

In the accompanying drawings,—

Figure 1 is a top plan view of a manure spreading machine constructed in accordance with the invention.

Fig. 2 is a vertical sectional view on the line 2—2 of Fig. 1 looking in the direction of the arrows.

Fig. 3 is a vertical transverse sectional view on the line 3—3 of Fig. 2 looking in the direction of the arrows.

Similar reference characters indicate corresponding parts throughout the several views in the drawings.

Referring to the drawings in detail A designates a portion of the center draft beam of the manure spreading machine, the said beam being supported near its rear end by an axle 5 disposed transversely of said beam and extended beyond opposite sides thereof, the axle being connected with the beam A through the medium of a bearing clip 6 which is fastened to said beam in any suitable manner. The bearing clip 6 is fastened upon the top face of the beam A spaced from its rear end, which latter has mounted thereon a seat bracket 7 carrying a seat 8 to be occupied by the operator of the machine.

Fixed on the outer ends of the axle 5 are ground or traction wheels 9.

Arranged on opposite sides of the draft beam A are independent bodies constituting manure containers 10, each being preferably of substantially rectangular shape and spaced apart through the medium of a hanger 11 fixed thereto near the rear ends and at the bottom of the same and also suitably secured to the underside of the center beam A. The axle 5 is extended transversely through the containers 10 and the sides thereof, while formed in the bottom 12 of these containers contiguous to the rearwardly inclined fronts 13 thereof are transversely disposed discharge openings 14 for the dropping of the manure from the containers 10 onto the ground upon the rows of growing crop. Arranged within the openings 14 are distributing rollers 15 supported upon a rotatable shaft 16 transversely of the containers 10 and journaled thereon, each roller 15 being of a width corresponding to the width of the container in which the same is arranged and having rake teeth 17 which serve to break up the manure within the containers 10 and discharge the same through the openings 14 in the bottom of the containers.

The bottom 12 of each container 10 rearwardly of the openings 14 is in the form of an endless belt or conveyer apron trained over friction rollers 18 journaled in any suitable manner upon the containers 10, transversely thereof, the rollers being spaced apart, with the front roller adjacent to the openings 14 and the rear roller adjacent to the back of the container. The pair of front rollers are supported upon a rotatable shaft 19 which is journaled in a hanger or bearing 20 depending from the underside of the draft beam A and on this shaft, between the containers 10, is a suitable sprocket wheel having trained thereover an endless sprocket chain 20' the same being also trained over a suitable sprocket wheel fixed to the shaft 16 so that motion from the latter will be imparted by the sprocket chain 20' to the shaft 19 for driving the front rollers 18 to move the belt or apron for the feeding of the manure within the containers 10 to the distributer rollers 15 whence the manure will be broken up and discharged through the openings 14 onto the ground upon the rows of the growing crop.

Fixed to the axle 5 adjacent to the ground or traction wheels 9 are suitable sprocket wheels having trained thereover endless sprocket chains 21, the same being also trained over suitable sprocket wheels fixed to the outer ends of the shaft 16 supporting the rollers 15 so that power from the axle 5 will be imparted to the rollers 15 for the rotation thereof as the machine is drawn through a field. It is of course understood that suitable draft animals are hitched to the draft beam A for the advancement of the machine.

Mounted on each container 10 at the portion forwardly of the discharge opening 14 is a guide 22 in which is fitted an adjustable slide or gate 23 which is manually adjusted relative to the opening 14 to vary the latter to regulate the distribution of manure from the container 10 through said opening 14 onto the ground.

In the advancement of the machine the manure within the containers 10 will be fed toward the distributing rollers 15 which will scatter the same while it is being discharged from the openings 14. The delivery of the manure can be regulated by the slides or gates 23 in the openings 14 in the bottoms of the respective containers.

From the foregoing it is thought that the construction and manner of operation of the machine will be clearly understood and therefore a more extended explanation has been omitted.

What is claimed is:

1. In a machine of the character described comprising a draft beam, an axle and ground wheels carried thereby, containers having forward discharge openings in the bottom thereof on each side of the draft beam, endless conveyers forming bottoms for said containers, discharge rollers positioned in the said discharge openings of said containers, horizontal, transverse, adjustable slides operable within the discharge openings, and means for driving the endless conveyer and the discharge rollers by the travel of the machine.

2. In a machine of the character described comprising a draft beam, an axle carried by said beam, ground wheels keyed to the axle, containers having forward discharge openings therein positioned on each side of the draft beam, said axle extending through the said containers, friction rollers and endless conveyers carried thereby, said containers constituting bottoms for the containers, transverse shafts journaled in the sides of the containers, distributing rollers carried by said transverse shafts forwardly of the conveyers, gearing between the axle and transverse shafts, and additional gearing interposed between the friction rollers and said transverse shafts whereby motion is communicated to the endless conveyers and said discharge rollers by the travel of the machine.

In testimony whereof, I affix my signature hereto.

WILLIAM C. LEMINGER.